Sept. 4, 1923.

M. S. FLORENCE

INDICATOR APPLICABLE TO THE TEACHING OF MUSIC OR THE SELECTING AND COMBINING OF COLORS

Filed Feb. 21, 1923

INVENTOR

M. S. Florence by Langner, Parry, Card & Langner

Att'ys.

Sept. 4, 1923.
M. S. FLORENCE
INDICATOR APPLICABLE TO THE TEACHING OF MUSIC OR THE SELECTING AND COMBINING OF COLORS
Filed Feb. 21, 1923    5 Sheets-Sheet 2
1,467,032
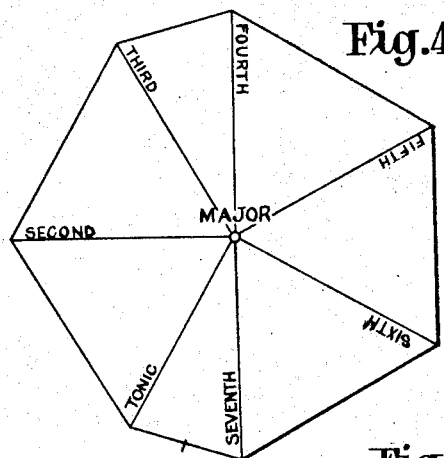
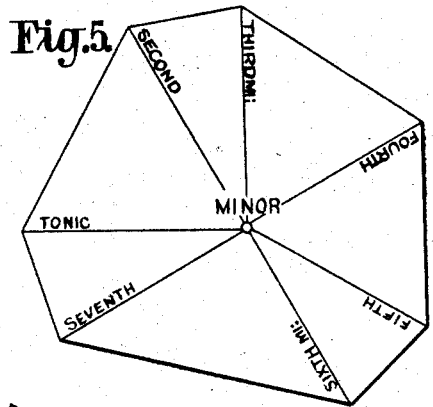
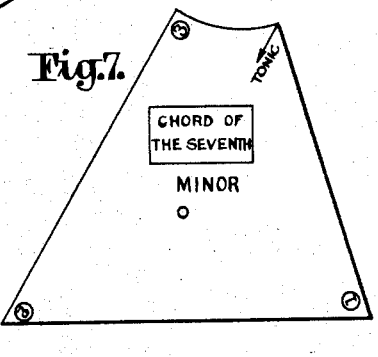
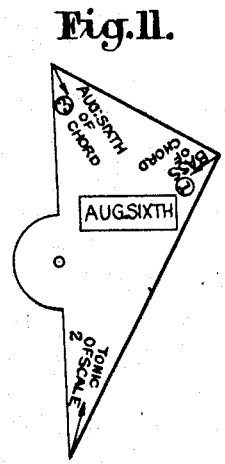
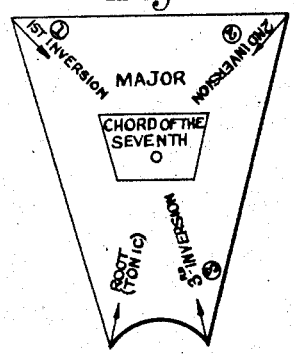
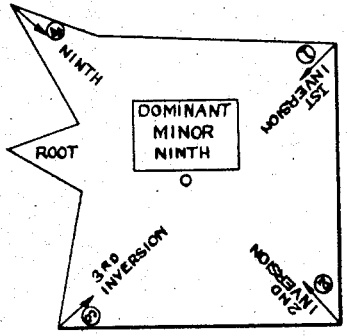
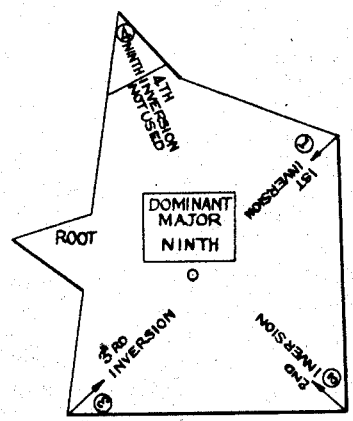
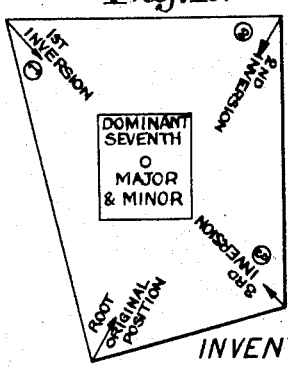
INVENTOR.
M. S. Florence Sept. 4, 1923.
M. S. FLORENCE
1,467,032
INDICATOR APPLICABLE TO THE TEACHING OF MUSIC OR THE SELECTING
AND COMBINING OF COLORS
Filed Feb. 21, 1923
5 Sheets-Sheet 3

INVENTOR.
M.S. Florence
by Langner, Parry, Card &
Langner
Attys.

Sept. 4, 1923.
M. S. FLORENCE
1,467,032
INDICATOR APPLICABLE TO THE TEACHING OF MUSIC OR THE SELECTING AND COMBINING OF COLORS
Filed Feb. 21, 1923    5 Sheets-Sheet 5
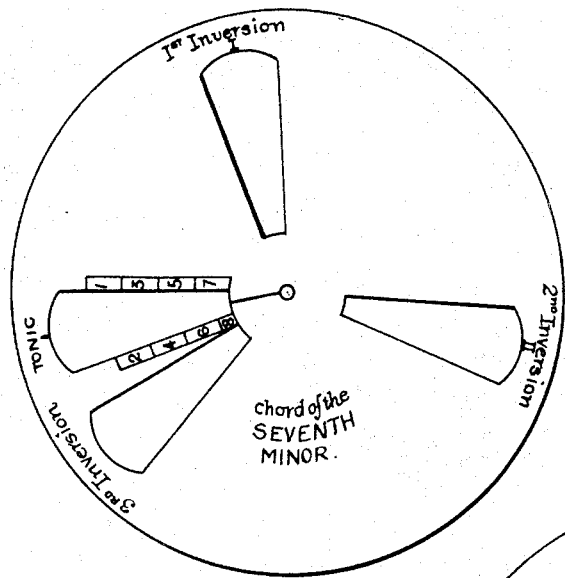
Fig. 18.
Fig. 19.
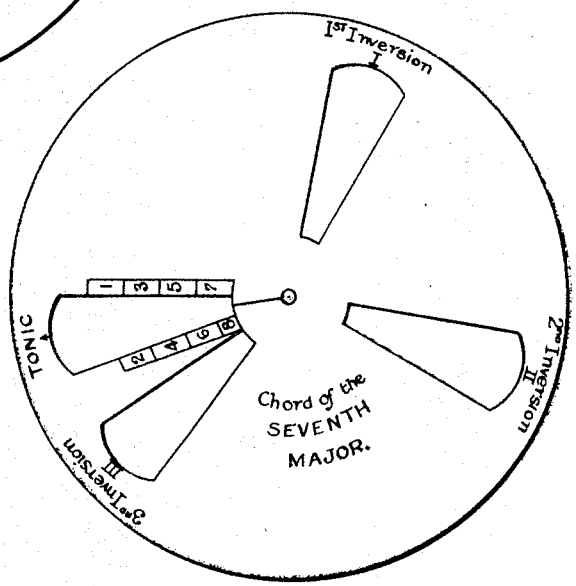
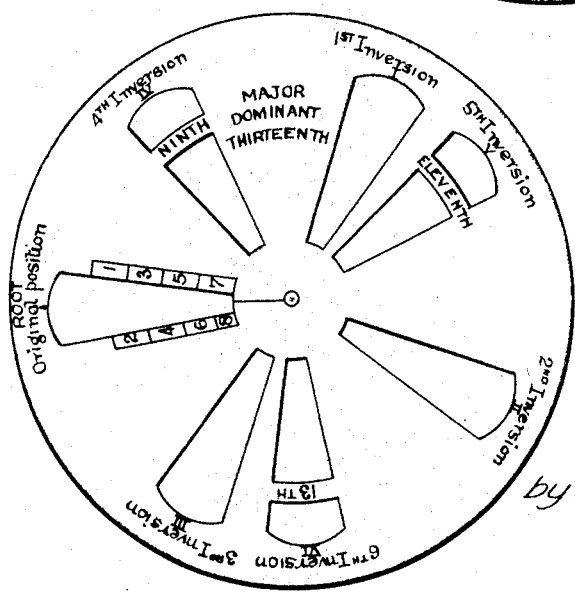
Fig. 20.
INVENTOR.
M. S. Florence
by Langner, Parry
Yard & Langner
Attys.

Patented Sept. 4, 1923.

1,467,032

UNITED STATES PATENT OFFICE.

MARY SARGANT FLORENCE, OF MARLOW, ENGLAND.

INDICATOR APPLICABLE TO THE TEACHING OF MUSIC OR THE SELECTING AND COMBINING OF COLORS.

Application filed February 21, 1923. Serial No. 620,480.

*To all whom it may concern:*

Be it known that I, MARY SARGANT FLORENCE, a subject of the King of Great Britain, residing at Lords Wood, Marlow, Bucks, England, have invented new and useful Improvements in Indicators Applicable to the Teaching of Music or the Selecting and Combining of Colors, of which the following is a specification.

This invention relates to indicators applicable to the teaching of music or the selection and combining of colors in accordance with musical or color theories and has particular reference to indicators of the dial type comprising a segmentally divided disc which may also be colored disc and a set of pointers cooperating therewith by superposition.

One of the objects of the present invention is to enable decorators, designers and persons similarly occupied but not gifted with the capacity to choose colors that can be harmoniously juxtaposed to invariably make combinations that will not clash or offend the artistic sense or good taste.

A further object of my invention is to provide an improved type of pointers or selectors for use with the segmentally divided disc.

A still further object of my invention is to enable the various intensities or depths of various colors to be correctly selected.

In music it is of course well known that notes separated by certain musical intervals will give a pleasing chord if struck simultaneously whereas others will make an objectionable noise or discord, and the use of dials or the like segmentally divided to correspond with the musical intervals of the diatonic scale is known for enabling students of music to learn the notes of various chords by placing over the dial triangular or other shaped plates or pointers having their corners or equivalent markings spaced apart correspondingly to the musical intervals of the notes of pleasing chords. If such a plate or pointer is placed on the dial with the appropriate corner pointing to the bass note of the required chord the remaining notes can be read off at the other corners. Dials colored segmentally on the traditional chromatic circle which consists of six equal arcs distinguished by six specific color names, have also been proposed for use with cornered plates or pointers for color selecting or harmonizing purposes but the present invention is based upon the division of the circle into seven arcs distinguished by seven specific color names and of which five of the arcs are equal and respectively double the length of each of the remaining two arcs which are equal to one another. Each of the five arcs I divide into two. Consequently the traditional chromatic circle when embodied into twelve equal sub-divisions carries with it six specific color names, whereas the circle in accordance with the present invention although when sub-divided as to the aforesaid five arcs also shows twelve equal sub-divisions is distinguished from the former by its seven specific color names.

My invention therefore in one of its embodiments comprises a dial or the like divided according to the intervals of the subdivided diatonic scale into segments each named after and in the order of the semitones of the scale and successively colored with the colors of and in the order in which they occur in the visible spectrum, and a number of selecting plates presenting corners, markings or the like spaced according to the musical intervals of notes or equivalent harmonic combinations of notes, the said plates or pointers co-operating with the dial or the like to indicate a number of colors in harmonic relation. If for example three colors in harmonic relation are desired, a triangular pointer with corners spaced according to the notes of a triad may be used, and if four colors are required a four cornered pointer with corners spaced according to the intervals of a 4-part chord such as a seventh or a dominant seventh may be used. In the case of the triad pointer the tonic corner is pointed to the tonic of the chord, whilst in the case of the 4-part chord pointer the tonic or the root corner is employed according as to whether the chord is a direct or a derived chord and the remaining members are indicated by the corners numbered successively 1, 2 and 3. For inversions of this 4-part chord the corners are read as follows:— first inversion—1, 2, 3 root; second inversion—2, 3, root, 1; third inversion—3 root, 1, 2.

A further feature of my invention consists in an improved form of pointers or selectors whether for use with the particular segmentally divided and colored dial above described or merely divided without being colored. My improved selectors in their preferred form are not polygonal but are in the form of discs having slots therein so spaced that harmonizing notes or colors are indicated through the slots by superposition on the dial. It is to be noted that as my improved dial is subdivided and colored sectorially to correspond to the semi-tones of the diatonic scale, the slots in my selector discs must be correspondingly spaced angularly thereby differing from selector discs slotted to co-operate with color discs divided in accordance with color theory as opposed to musical theory. The selectors are preferably slotted radially to a considerable extent and the dial is preferably colored with successive concentric bands so that each slot exposes a color in several grades of intensity or depth.

The above features of my invention and such others as are incidental thereto will now be described more fully with reference to the accompanying drawings which represent the preferred embodiments of my dial and a number of pointers for use therewith.

Figures 4 to 11 illustrate other pointers for use with the dial.

Figures 15 to 20 are plan views of other selector discs for use with the dial shown in Figure 12, the radial slots being spaced in accordance with various musical intervals.

Figure 1:
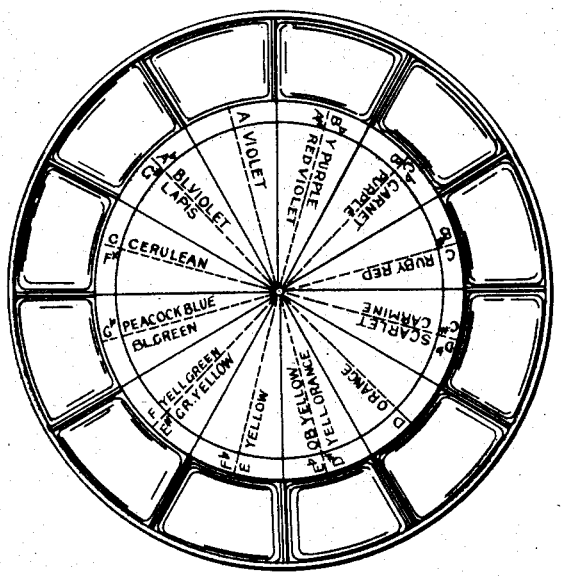
Figure 1 is a plan view of one of my dials by itself.
Figure 2:
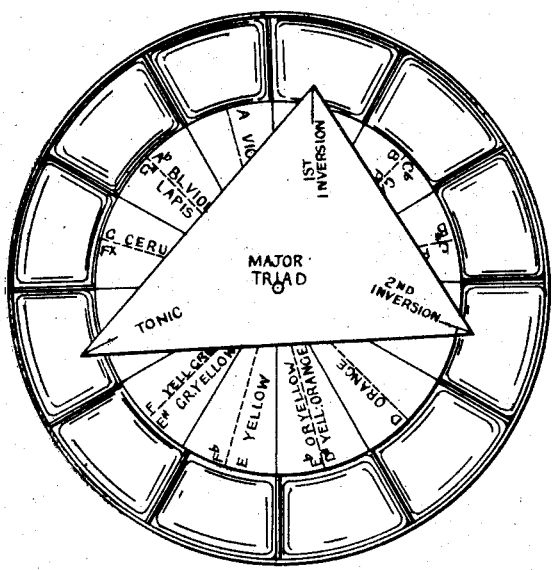
Figure 2 is a similar view of the dial with a cooperating pointer in selecting position thereon.
Figure 3:
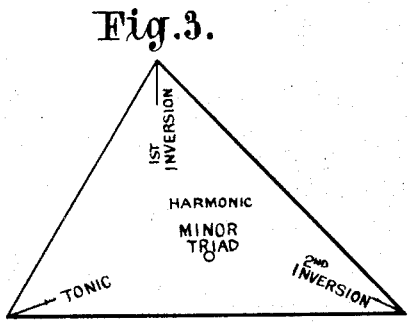
Figure 3 illustrates the opposite face of the pointer shown in Figure 2.

Referring first to Figure 1 it is seen that the face of the dial is divided equally into twelve segments corresponding with the sub-divided intervals of the diatonic scale, and that twelve colors selected in the order in which they occur in the visible spectrum are allotted to the twelve segments. These twelve segments are derived from seven segments five of which are equal and twice the size of the other two, and the five are then divided in two. The two smaller segments correspond to the musical semitone intervals between the notes B and C and the notes E and F respectively; the other five segments correspond to the other whole tone intervals according to the other notes of the musical scale the sequence of course corresponding to whole tone, whole tone, semi-tone, whole tone, whole tone, whole tone, semi-tone. Each whole tone is divided into two semitones thus producing a complete dial of twelve segments representing the twelve semitones of the diatonic scale. Figure 2 shows a pointer the corners of which point to three colors in harmonic relation corresponding with a major triad in music, it being understood that the corners of the pointer are so spaced that they do in fact register with the dial segments corresponding with the intervals of a major triad.

If three harmonic colors corresponding to a minor triad are required the pointer of Figure 2 is reversed and applied in the same way, i. e. with the "tonic" corner of the reverse side over the bass note, the other two corners then indicating the other two notes of that minor triad.

It will be appreciated that since the musical intervals between the notes of a chord are the same in whatever key the chord is played, my pointers may be placed on any group of colors and serve as chord-builders. For example in the case of using a triad pointer the corner marked "tonic" may be placed in any color segment corresponding to the bass or fundamental color of the desired color scheme.

In the case of requiring more than three colors or a juxtaposition of colors different from those given by the triad pointer any one of the pointers illustrated in Figures 4 to 11 may be used.

The pointers represented by Figures 4 to 11 are successively; major diatonic scale; minor diatonic scale; major chord of the seventh; minor chord of the seventh; dominant major ninth; dominant minor ninth; dominant seventh (major and minor) and augmented sixth.

Where it is required to select colors corresponding to chords of the dominant in any tonality chosen, the root (or bass-note of the chord) is indicated by placing the corner that is marked root on the dominant chord pointers upon the dominant (fifth) of the tonic. The remaining corners being marked respectively 1, 2, 3, 4, the original position of the dominant chord is given by reading successively root 1, 2, 3, 4. For inversions of the same chord the pointer is retained in the same position and read thus—first inversion 1, 2, 3, 4; second inversion 2, 3, 4, 1; third inversion 3, 4, 1, 2; fourth inversion 4, 1, 2, 3 (when used, and subject to the laws that hold in musical harmonic theory).

Although I have described my invention as taking the form of a dial with superposing plates it is of course capable of structural modification. For example the dial might be substituted by a cylinder and the plates by encircling rings.

As my indicator is particularly intended for the use of decorators, designers and the like, who may not be conversant with musical theory, the dial and pointers need not actually carry indications of the musical notes, for convenience and ease in distinguishing the two forms, the segmentally colored discs when provided with indications of musical notes, may be termed a harmonic compass, and when not so provided it may be termed a color compass.

Figure 12:
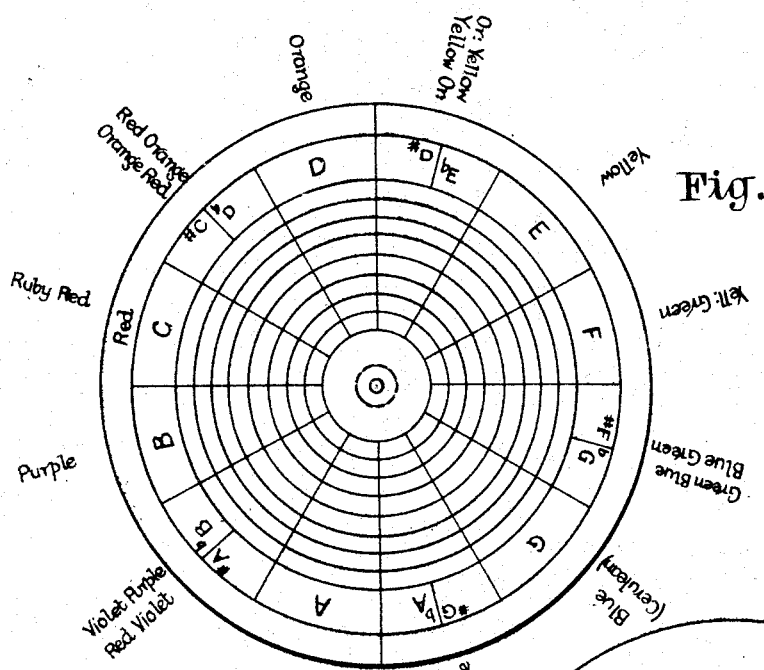
Figure 12 is a plan view of a dial divided and colored segmentally in accordance with musical theory, and also colored with concentric bands of graded intensity.

Referring now to the dial shown in Figure 12, each segment is supposed to be graded in color radially, the various hues, or tones of color corresponding in intensities, or tones of color corresponding to octaves on the pianoforte scale, being shown by the concentric bands in the drawing. The greatest intensity of each color is preferably at the circumference of the disc, the intensity diminishing in each segment as the centre is approached. Although I have shown eight grades of color in the drawing it is not to be understood that this in any way limits the number of grades of color that may be arranged between the circumference and the centre of the circle.

Figure 13:
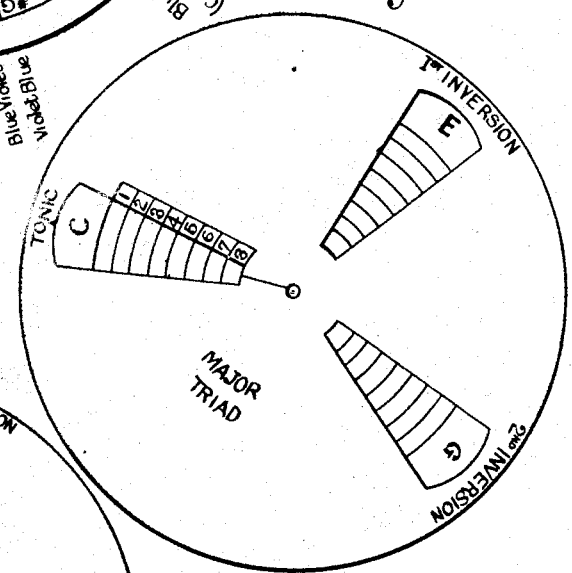
Figures 13 and 14 are plan views of a triad selector of my improved disc type placed in position on the dial shown in Figure 12 the successive concentric bands being visible through the slots.
Figure 14:
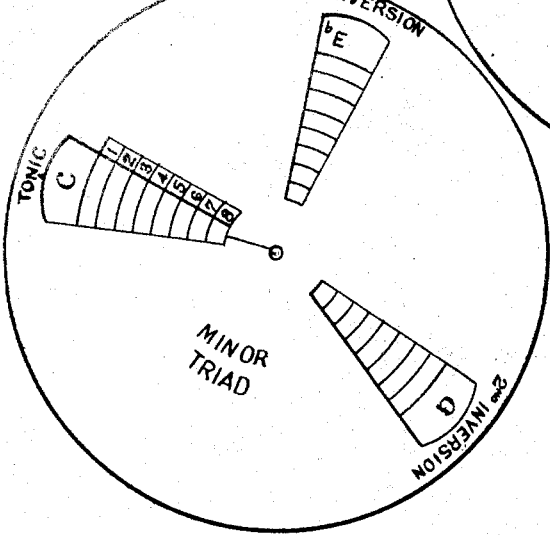
Figure 15:
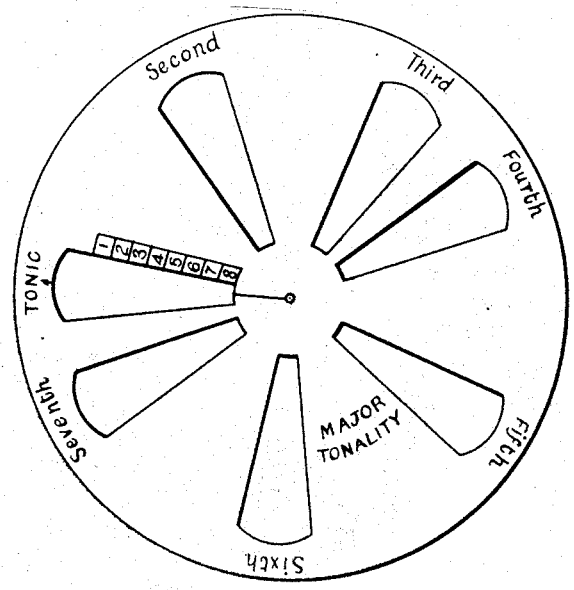
Figure 16:
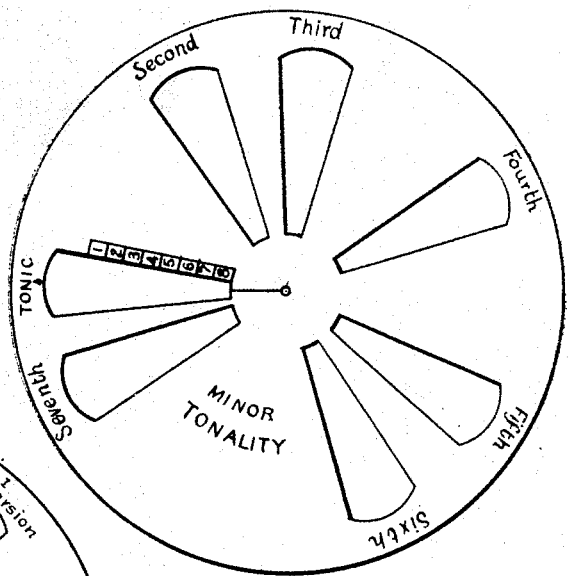
Figure 17:
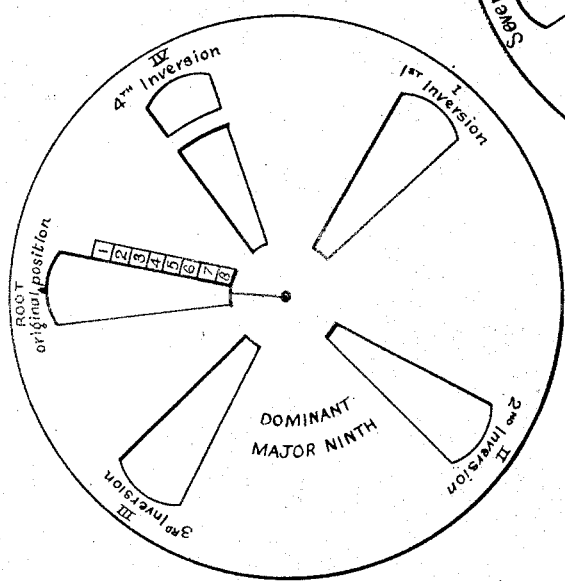

Figures 13 to 20 illustrate various selectors of the radially slotted disc type in accordance with my invention. Each of these discs is slotted radially in accordance with the musical intervals of a particular chord and it will be appreciated that the disc which is used for any particular purpose will depend upon the number of colors it is desired to combine; for instance if three harmonic colors according to a major triad are required the disc shown in Figure 13 is used. The "tonic" in this case is placed over the color corresponding to the bass note, the two other slots then indicating the colors corresponding to the two other notes of that major triad. It will be understood that all the grades in intensity of any particular color are seen through the slots and any one grade of color in any one slot may be combined with any other grade in a combining color.

As the musical intervals between the notes of a chord are the same in whatever key the chord is played the discs may be placed on any group of colors, that is to say that if one slot is placed on any color segment corresponding to the base or fundamental hue of a color scheme the other slots will correctly indicate the other hues of the desired color scheme.

Where it is required to select colors corresponding to chords of the dominant in any tonality chosen the root (or bass note of the chord) is indicated by placing the slot that is marked root on the dominant chord discs upon the dominant of the tonic. The remaining slots being marked respectively in their order say 1, 2, 3, the original position in this case being given by reading successively root 1, 2, 3. For inversion of the same chord the disc is maintained in the same position and chord: first inversion 2, 3, root; second inversion 3, root, 1; third inversion 3, root, 1, 2; number a.

The significance of the various selector discs will be apparent from an inspection of the figures. In the case of using selectors for more than four hues certain inversions are subject to the laws of musical harmonic relations and particulars of them may be printed on the back of such selectors. It may be specially noted that the deepest in the hue corresponding to the ninth is eliminated by the selector shown in Figure 17, and in the case of the dominant thirteenth shown in Figure 20 the same mode of elimination is adopted in the case of the slots corresponding to the "ninth" "eleventh" and "thirteenth" intervals. In a cheap form of the color compass the segments may be merely printed with the names of colors instead of being actually colored.

Obviously apart from the coloring of the dial, the musical notation thereon in conjunction with the selector discs is a valuable aid to the self-teaching of music and musical theory.

What I claim is:

1. A device applicable to the selecting and combining of colors, comprising a dial divided into segments corresponding in number to the intervals of the sub-divided diatonic scale and colored in accordance with the sequence of colors apparent in the visible spectrum, and a plurality of differing selector members having indications spaced according to the musical intervals of harmonic combinations of notes and capable of co-operating with the dial by superposition to indicate a number of colors in harmonic relation.

2. A device applicable to the teaching of music and the selecting and combining of colors, comprising a dial divided into segments corresponding in number to and named after, the intervals of the sub-divided diatonic scale and colored in accordance with the sequence of colors apparent in the visible spectrum, and a plurality of different selector members having indications spaced according to the musical intervals of harmonic combinations of notes and capable of co-operating with the dial by superposition to indicate a number of colors and notes in harmonic relation.

3. A device applicable to the selecting and combining of colors, comprising a dial divided into segments corresponding in number to the intervals of the sub-divided diatonic scale and colored in accordance with the sequence of colors apparent in the visible spectrum, and divided as to each segment into concentric bands, and a plurality of differing selector discs having elongated radial slots therein spaced according to the musical intervals of harmonic combinations of notes and capable of co-operating with the dial by superposition to indicate a number of colors in harmonic relation and different intensities of each of the exposed colors.

4. A device applicable to the selecting and combining of colors, comprising a dial divided into twelve sectors corresponding to the intervals of the subdivided diatonic scale and colored in accordance with the sequence of colors apparent in the visible spectrum each color being in concentric bands of graded intensity, and a plurality of differing selector discs having elongated radial slots therein for individual superposition on said dial to expose harmonically related colors and different intensities of each exposed color.

5. A device applicable to the selecting and combining of colors, comprising a dial divided into twelve sectors having in sequence the color names ruby red, carmine—scarlet, orange, yellow orange—orange yellow, yellow, green yellow—yellow green, blue green—peacock blue, cerulean, lapis—blue violet, violet, red violet—violet purple, purple-garnet, and a plurality of differing selector plates having indications spaced according to the musical intervals of the diatonic scale and capable of co-operating with the dial by superposition.

6. An outfit for use with a segmentally divided dial of a device of the dial and superposed selector type as described, comprising, a plurality of differing selector members each member having slots therein spaced according to the musical intervals of one of a plurality of differing harmonic combinations of notes, for exposing corresponding parts of the dial when any of said members is superposed thereon whereby the range and capabilities of the device is increased in accordance with the number of said selector members.

7. An outfit according to claim 6, said slots being elongated radial slots.

MARY SARGANT FLORENCE.